United States Patent
Lee et al.

(10) Patent No.: US 9,294,382 B2
(45) Date of Patent: Mar. 22, 2016

(54) COMMUNICATION DEVICE AND METHOD FOR ENHANCING ENERGY EFFICIENCY

(75) Inventors: Byung Moo Lee, Seoul (KR); Byung Chang Kang, Yonin-si (KR); Jong Ho Bang, Suwon-si (KR); Jin Hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 13/559,993

(22) Filed: Jul. 27, 2012

(65) Prior Publication Data

US 2013/0028160 A1 Jan. 31, 2013

(30) Foreign Application Priority Data

Jul. 28, 2011 (KR) .................. 10-2011-0075097

(51) Int. Cl.
| | |
|---|---|
| H04J 11/00 | (2006.01) |
| H04L 12/26 | (2006.01) |
| H04B 7/208 | (2006.01) |
| H04L 27/18 | (2006.01) |
| H04L 27/36 | (2006.01) |
| H04W 24/00 | (2009.01) |
| H04L 27/26 | (2006.01) |
| H04L 27/08 | (2006.01) |

(52) U.S. Cl.
CPC ............ *H04L 43/50* (2013.01); *H04L 27/2623* (2013.01); *H04W 24/00* (2013.01); *H04L 27/08* (2013.01)

(58) Field of Classification Search
CPC ..... H04L 27/2623; H04L 27/08; H04L 43/50; H04W 52/02; H04W 24/00
USPC .......... 375/210, 295, 296; 370/210, 329, 337, 370/252, 344; 365/226; 455/103, 116
See application file for complete search history.

(56) References Cited

U.S. PATENT DOCUMENTS

| | | | |
|---|---|---|---|
| 7,359,341 B2* | 4/2008 | Okamoto et al. ............. | 370/310 |
| 7,778,350 B2* | 8/2010 | Futagi et al. .................. | 375/295 |
| 7,796,498 B2 | 9/2010 | Yin et al. | |
| 7,822,136 B2 | 10/2010 | Moffatt et al. | |
| 2001/0044915 A1* | 11/2001 | Vandersteen et al. ......... | 714/704 |
| 2003/0002115 A1* | 1/2003 | Schemmann et al. ........ | 359/173 |
| 2005/0201180 A1* | 9/2005 | Naguib et al. ................ | 365/226 |
| 2007/0178854 A1* | 8/2007 | Sutardja ........................ | 455/116 |
| 2008/0019453 A1* | 1/2008 | Zhao et al. .................... | 375/260 |
| 2008/0089437 A1* | 4/2008 | Frederiksen et al. ......... | 375/296 |
| 2008/0137767 A1 | 6/2008 | Jaenecke | |
| 2009/0323857 A1 | 12/2009 | Singh et al. | |
| 2010/0157910 A1* | 6/2010 | Nentwig et al. .............. | 370/329 |
| 2011/0116383 A1 | 5/2011 | Lipka | |
| 2011/0122930 A1 | 5/2011 | Al-Naffouri et al. | |

FOREIGN PATENT DOCUMENTS

| | | |
|---|---|---|
| KR | 10-2003-0059523 | 7/2003 |
| KR | 10-2004-0102818 A | 12/2004 |

(Continued)

*Primary Examiner* — Alpus H Hsu
*Assistant Examiner* — Camquyen Thai
(74) *Attorney, Agent, or Firm* — NSIP Law

(57) ABSTRACT

Provided is a method and device for increasing energy efficiency by adaptively performing clipping with respect to an input signal. The method may adaptively determine a clipping ratio (CR) based on a modulation method of the communication device and perform clipping based on the determined CR.

22 Claims, 6 Drawing Sheets

(56) References Cited

FOREIGN PATENT DOCUMENTS

| | | |
|---|---|---|
| KR | 10-2005-0108219 A | 11/2005 |
| KR | 10-2006-0066030 A | 6/2006 |
| KR | 10-2006-0073638 A | 6/2006 |
| KR | 10-2008-0059658 A | 6/2008 |
| KR | 10-2011-0012322 A | 2/2011 |
| KR | 10-2011-0067872 | 6/2011 |

* cited by examiner

COMMUNICATION DEVICE AND METHOD FOR ENHANCING ENERGY EFFICIENCY

CROSS-REFERENCE TO RELATED APPLICATION(S)

This application claims the benefit under 35 USC §119(a) of Korean Patent Application No. 10-2011-0075097, filed on Jul. 28, 2011, in the Korean Intellectual Property Office, the entire disclosure of which is incorporated herein by reference for all purposes.

BACKGROUND

1. Field

The following description relates to a device and method for increasing energy efficiency by clipping an input signal to meet both a peak to average power ratio (PAPR) and a bit error ratio (BER) within a target band.

2. Description of Related Art

Currently, an orthogonal frequency division modulation (OFDM) technology is used for high speed transmission of large amounts of data. When the OFDM scheme is used, a peak to average power ratio (PAPR) of an OFDM signal may reduce an efficiency of a high power amplifier (HPA) of a communication device. Such a communication device may include a fixed base station, a mobile base station, a micro base station such as a femto base station, a data transmitter such as a relay, a fixed terminal device, a mobile terminal device, a data receiver such as a relay, and the like.

Generally, a communication device may increase efficiency of a high power amplifier using discrete Fourier transform-spread-OFDM (DFT-S-OFDM) or single carrier-frequency division multiple access (SC-MMA). When the DFT-S-OFDM or SC-FDMA is used, the communication device may spread signals from a frequency domain through DFT.

However, although the efficiency of the large power amplifier may be increased by reducing the PAPR using SC-FDMA, a pilot overhead may be increased and a link performance may be reduced in higher dimensional modulation such as 16 quadrature amplitude modulation (QAM) or 64 QAM. Reduction in the link performance may create an inter symbol interference (ISI), consequently reducing power efficiency of the communication device.

Accordingly, there is a need for a technology for increasing power efficiency even when high dimensional modulation is applied.

SUMMARY

In an aspect, there is provided a method for increasing energy efficiency of a communication device, the method including adaptively determining a clipping ratio (CR) of a signal input to the communication device based on a modulation method of the communication device, performing an inverse fast Fourier transform (IFFT) on the input signal, and in response to determining to clip the input signal, clipping the IFFT signal based on the adaptively determined CR.

The adaptively determining may comprise setting the CR to be higher if the modulation method corresponds to a higher dimensional modulation method.

The adaptively determining may comprise adaptively determining the CR based on a maximum allowable signal amplitude determined based the modulation method and power of the input signal.

The adaptively determining may comprise determining whether to perform at least one of clipping and single carrier-frequency division multiple access (SC-FDMA) with respect to the input signal based on a neighboring modulation method.

The adaptively determining may comprise determining to clip the input signal if the neighboring modulation method and a self modulation method are low dimensional modulation methods, and determining to perform at least one of clipping and SC-FDMA with respect to the input signal if the neighboring modulation method is a high dimensional modulation method and the self modulation method is a low dimensional modulation method.

The adaptively determining may comprise determining whether to perform clipping with respect to the input signal based on a signal to interference plus noise ratio (SINR) of the input signal when the modulation method is a high dimensional modulation method.

The adaptively determining may comprise determining whether to perform clipping with respect to the input signal based on the modulation method and location of a terminal The adaptively determining may comprise determining to skip clipping with respect to the input signal when the modulation method is a 16 quadrature amplitude modulation (QAM) or higher dimensional modulation method, and determining to perform clipping with respect to the input signal when the modulation method is a quadrature phase shift keying (QPSK) method and the terminal device is located at an edge of a cell.

The method may further comprise performing band pass filtering with respect to the clipped signal.

In an aspect, there is provided a method of a communication device for increasing energy efficiency, the method including adaptively determining a clipping ratio (CR) for a signal input to the communication device based on a location of a terminal device in a cell, performing inverse fast Fourier transform (IFFT) on the input signal, and clipping the IFFT signal based on the adaptively determined CR.

The adaptively determining may comprise determining the CR to be higher the farther away the terminal device is located from a center of the cell in which the terminal device is located and to be lower the closer the terminal device is located to the center of the cell.

The may be performed by a base station that serves the terminal device, and the input signal may be a signal received by the base station from the terminal device.

The method may be performed by the terminal device, and the input signal may be a signal received by the terminal device from a base station.

In an aspect, there is provided a method of a communication device for increasing energy efficiency, the method including adaptively determining a clipping ratio (CR) for a signal input to the communication device based on a signal to interference plus noise ratio (SINR) of the input signal, performing inverse fast Fourier transform (IFFT) on the input signal, and clipping the IFFT signal based on the adaptively determined CR.

The adaptively determining may comprise determining the CR to be lower in response to the SINR being lower and determining the CR to be higher in response to the SINR being higher.

In an aspect, there is provided an energy efficiency increasing communication device, including a clipping ratio (CR) determination unit configured to adaptively determine a CR for a signal input to the communication device based on a modulation method of the communication device, an inverse fast Fourier transform (IFFT) unit configured to perform IFFT on the input signal, and a clipping unit configured to clip the IFFT signal based on the adaptively determined CR, in response to determining that clipping is to be performed.

The CR determination unit may set the CR higher if the modulation method corresponds to a higher dimensional modulation method.

The CR determination unit may adaptively set the CR based on a maximum allowable signal amplitude that is determined based on the modulation method and power of the input signal.

The CR determination unit may determine whether to perform at least one of clipping and single carrier-frequency division multiple access (SC-FDMA) with respect to the input signal based on a neighboring modulation method.

The CR determination unit may determine whether to perform clipping with respect to the input signal based on a signal to interference plus noise ratio (SINR) of the input signal when the modulation method is a high dimensional modulation method.

The CR determination unit may determine whether to perform clipping with respect to the input signal based on the modulation method and a location of a terminal device.

The apparatus may further comprise a filtering unit configured to perform band pass filtering with respect to the clipped signal.

Other features and aspects will be apparent from the following detailed description, the drawings, and the claims.

Figure 1:
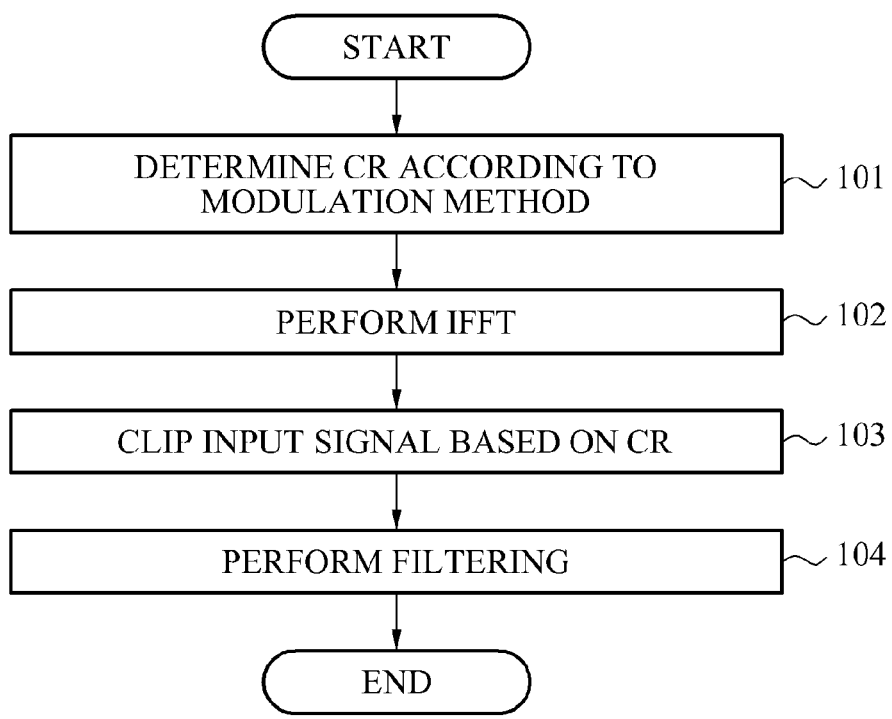
FIG. 1 is a flowchart illustrating an example of a method for increasing energy efficiency of a communication device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a method for increasing energy efficiency of a communication device.

Referring to FIG. 1, in 101, the communication device adaptively determines a clipping ratio (CR) based on a modulation method of the communication device. For example, the modulation method or scheme may include a low dimensional modulation method such as quadrature phase shift keying (QPSK), 16 quadrature amplitude modulation (QAM), and a high dimensional modulation such as 64 QAM or higher. As an example, the communication device may include a fixed base station, a mobile base station, a micro base station such as a femto base station, a data transmitter such as a relay, a fixed terminal device, a mobile terminal device, a data receiver such as a relay, and the like.

In various aspects, the communication device may set the CR to be higher when the modulation method is higher dimensional in comparison to when the modulation method is lower dimensional. For example, if the modulation method is QPSK, the communication device may set the CR of the QPSK to be 'a' decibels (dB). If the modulation method is 16 QAM, the communication device may set the CR of the 16 QAM to be 'b' dB. If the modulation method is 64 QAM, the communication device may set the CR of the 64 QAM to be 'c' dB. Here, relationships among a, b, and c decibels may be a<b<c.

For example, a maximum allowable signal amplitude ($A_{max}$) corresponding to respective modulation methods may be preset. Accordingly, the communication device may adaptively determine the CR based on the maximum allowable signal amplitude corresponding to the respective modulation method and based on power ($P_{in}$) of an input signal as shown in Equation 1.

$$CR = \frac{A_{max}}{\sqrt{P_{in}}} \quad \text{[Equation 1]}$$

In Equation 1, CR denotes the clipping ratio, $A_{max}$ denotes the maximum allowable signal amplitude, and $P_{in}$ denotes the power of the input signal.

According to Equation 1, the CR increases as the $A_{max}$ increases. In this example, when the CR is lower, a peak to average power ratio (PAPR) may be increased, thereby increasing power efficiency. However, in this case, bit error ratio (BER) performance may be reduced because of distortion from clipping. Therefore, the communication device may adaptively determine the CR to be high or low based on the modulation method. For example, the maximum allowable signal amplitude for a higher dimensional modulation method may be preset to be higher than the maximum allowable signal amplitude for a lower dimensional modulation method. Thus, the communication device may adaptively determine the CR based on the modulation method which is based on the preset maximum allowable signal amplitude.

As an example, the communication device may preset the maximum allowable signal amplitude corresponding to the respective modulation methods using an error vector magnitude (EVM). As shown in Equation 2, the EVM may be calculated based on an original input signal and the clipped signal. Accordingly, the maximum allowable signal amplitude may be adaptively preset based on the modulation methods which are based on the calculated EVM.

$$EVM(\%) = \sqrt{\frac{\sum_n |x(n) - \hat{x}(n)|^2}{\sum_n |x(n)|^2}} \quad \text{[Equation 2]}$$

In Equation 2, x(n) denotes the original input signal and x̂(n) denotes the clipped signal.

Referring again to FIG. 1, in 102, the communication device performs inverse fast Fourier transform (IFFT) with respect to the input signal. For example, the communication device may perform oversampling with respect to the input signal and perform IFFT with respect to the input signal. In addition, the communication device may insert samples in the IFFT signal.

In 103, the communication device clips an amplitude of the input signal in which the samples are inserted, based on the CR.

In 104, the communication device performs band pass filtering with respect to the clipped input signal. In addition, the communication device may convert and output the filtered signal into an analog signal.

According to various aspects, clipping of the input signal may influence signals (i.e. act as noise) to bands neighboring the band that includes the clipped signal. Therefore, the communication device may filter the clipped signal so that the clipped signal is included in a target band and signals present beyond the target band are reduced or removed. In this example, as the clipped signal is filtered, noise influences caused with respect to the neighboring band by the clipping may be reduced or removed.

Figure 2:
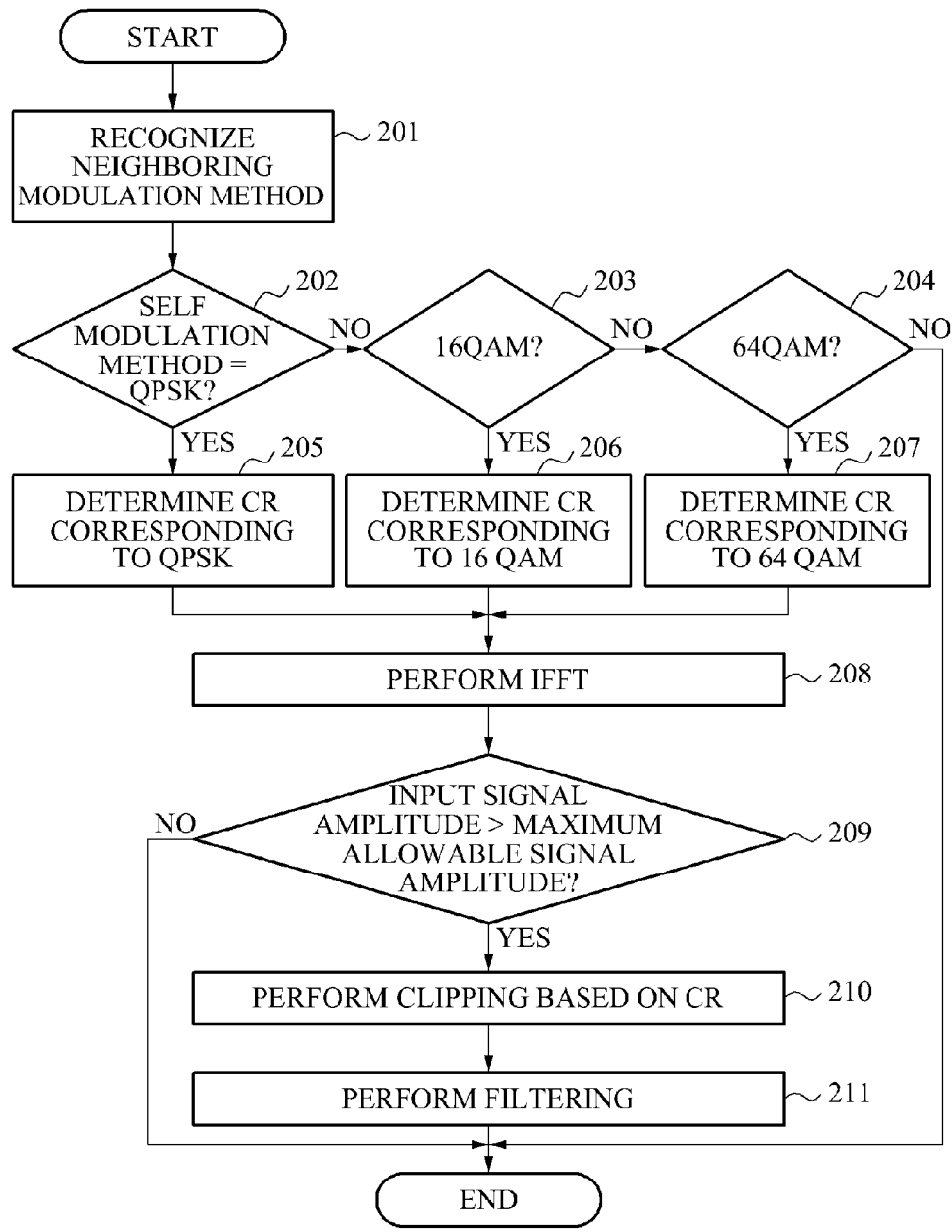
FIG. 2 is a flowchart illustrating an example of a method for adaptively determining a clipping ratio (CR) based on a modulation method.

FIG. 2 illustrates an example of a method for adaptively determining a CR based on a modulation method.

Referring to FIG. 2, in 201, a communication device recognizes a neighboring modulation method. For example, if the communication device is a terminal, the terminal may recognize the neighboring modulation method by receiving, from a base station, information on modulation methods used by neighboring terminal devices.

In 202 to 204, the communication device recognizes whether a self modulation method is a low dimensional modulation method or a high dimensional modulation method. Here, the self modulation method refers to the modulation method of the communication to device. For example, the low dimensional modulation method may include QPSK and 16 QAM, while the high dimensional modulation method may include 64 QAM or higher.

In this example, if the self modulation method is recognized as the QPSK (202:YES), the communication device determines the CR corresponding to the QPSK, in 205. For example, the communication device may determine the CR corresponding to the QPSK using a maximum allowable signal amplitude $A_{max}$ preset corresponding to the QPSK and the power $P_{in}$ of the input signal.

As another example, if the self modulation method is the 16 QAM (203:YES), the communication device determines the CR corresponding to the 16 QAM, in 206. Also, in the same manner, if the self modulation method is the 64 QAM (204: YES), the communication device determines the CR corresponding to the 64 QAM, in 207.

In 208, the communication device performs oversampling and IFFT with respect to the input signal. Next, the communication device may insert samples in the IFFT signal.

In 209, the communication device compares an amplitude of the input signal to the maximum allowable signal amplitude corresponding to the CR. For example, if the amplitude of the input signal is greater than the maximum allowable signal amplitude corresponding to the CR determined according to the modulation method (209:YES), the communication device clips the amplitude of the input signal based on the determined CR. For example, if the amplitude of the input signal is 8 dB and the maximum allowable signal amplitude is 6 dB, the communication device may clip the amplitude of the input signal to 6 dB. As another example, if the amplitude of the input signal is 8 dB and the maximum allowable signal amplitude is 10 dB, the communication device may skip the clipping.

In 210, the communication device clips the amplitude of the input signal based on a result of the comparison.

In 211, the communication device performs band pass filtering with respect to the clipped signal so that the clipped signal does not influence signals of bands that neighbor the band that includes the clipped signal. In addition, the communication device may convert the filtered signal in a digital state into an analog signal.

Figure 3:
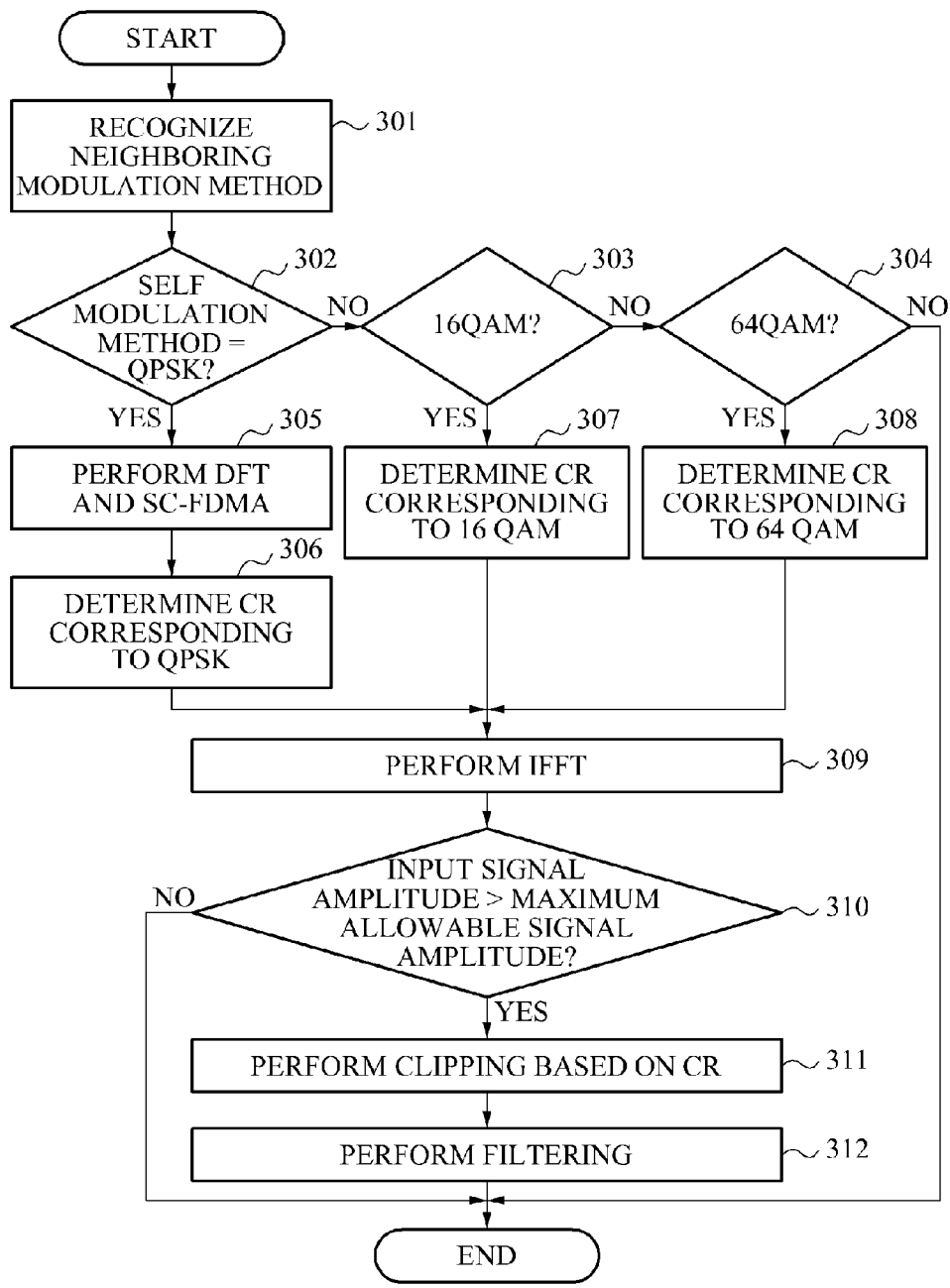
FIG. 3 is a flowchart illustrating an example of a method for increasing energy efficiency by applying single carrier-frequency division multiple access (SC-FDMA) and clipping in combination.

FIG. 3 illustrates an example of a method for increasing energy efficiency by applying SC-FDMA and clipping in combination.

Referring to FIG. 3, in 301, a communication device recognizes a neighboring modulation method. For example, the communication device may be a terminal. Accordingly, the terminal may recognize the neighboring modulation method by receiving, from a base station, information on modulation methods used by neighboring terminal devices.

In 302 to 304, the communication device recognizes a self modulation method. In addition, the communication device may determine whether to perform at least one of clipping and SC-FDMA with respect to an input signal based on the self modulation method and the neighboring modulation method.

For example, if the self modulation method and the neighboring modulation method are both low dimensional modulation methods, the communication device may determine to perform clipping with respect to the input signal. As an example, the low dimensional modulation method may include QPSK. As another example, if the self modulation method is a low dimensional modulation method while the neighboring modulation method is a high dimensional modulation method, the communication device may determine to perform both clipping and SC-FDMA with respect to the input signal.

In yet another example, if the self modulation method is a low dimensional modulation method while the neighboring modulation method is a high dimensional modulation method, the communication device may determine whether to skip clipping and perform only SC-FDMA. By performing SC-FDMA with respect to the input signal and by not clipping the input signal, a noise interference (NI) may be reduced. Accordingly, the communication device may determine whether to skip clipping and perform only SC-FDMA based on the NI of the signal to which the SC-FDMA is performed.

If both SC-FDMA and clipping are performed, the communication device may perform SC-FDMA with respect to the input signal in 305. In addition, in 306, the communication device determines a CR that corresponds to the self modulation method. For example, the communication device may set the CR to be higher when the modulation method is at a higher dimension than when the modulation method is at a lower dimension.

If the self modulation method is 16 QAM, in 307 the communication device determines the CR corresponding to 16 QAM. If the self modulation method is 64 QAM, in 308 the communication device determines the CR corresponding to 64 QAM.

In 309, the communication device performs IFFT with respect to the input signal. In 310, the communication device compares an amplitude of the IFFT input signal to a maximum allowable signal amplitude corresponding to the CR.

In this example, if the amplitude of the IFFT input signal is greater than the maximum allowable signal amplitude corresponding to the CR, the communication device clips the amplitude of the IFFT input signal based on the maximum allowable signal amplitude, in 311. Thus, if the self modulation method is QPSK, the communication device may increase efficiency of a PAPR by applying at least one of SC-FDMA and clipping.

In 312, the communication device performs band pass filtering with respect to the clipped input signal. In addition, the communication device may convert and output the filtered signal in a digital state into an analog signal.

Figure 4:
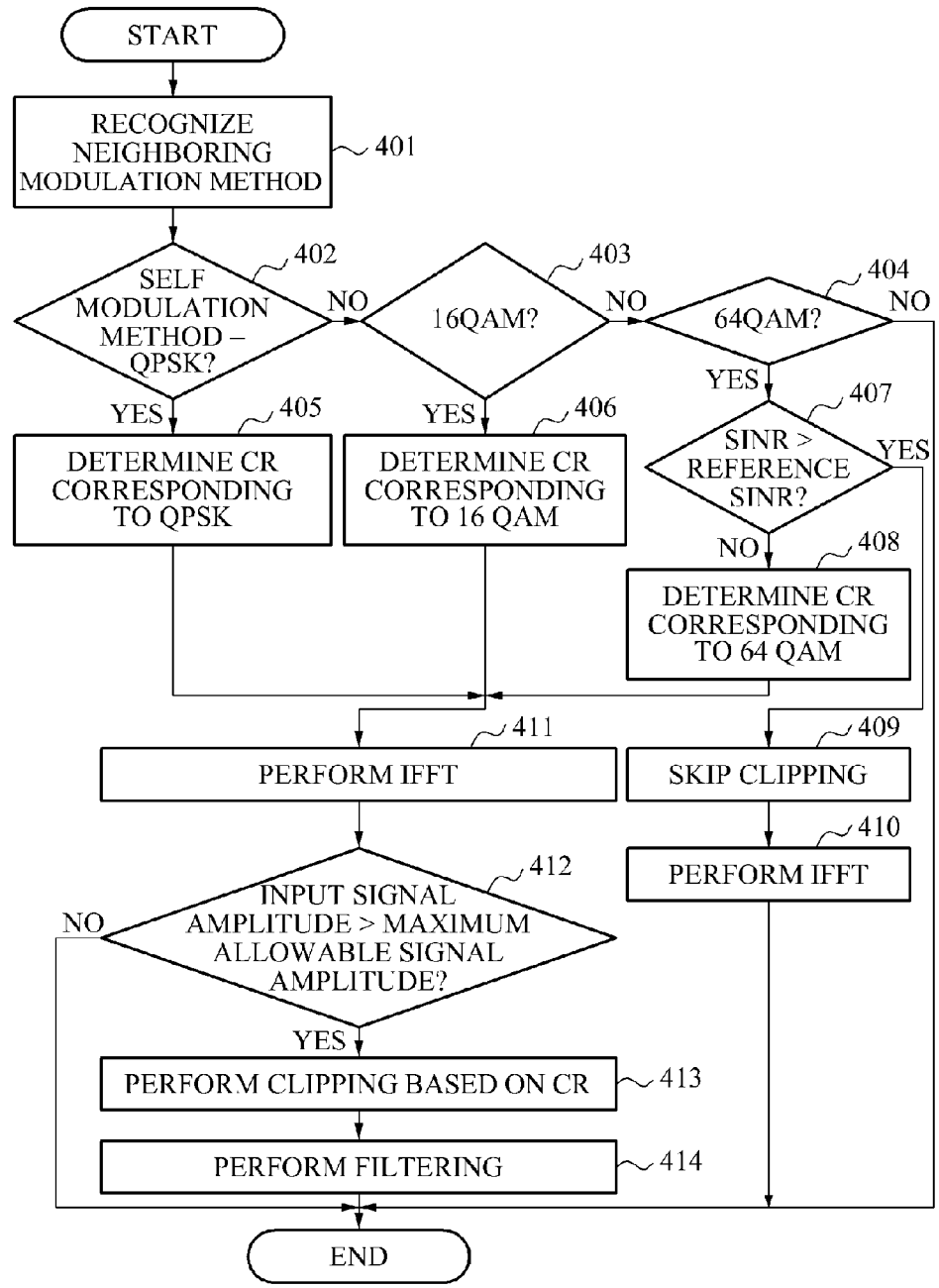
FIG. 4 is a flowchart illustrating an example of a method in which clipping is skipped in high dimensional modulation.

FIG. 4 illustrates an example of a method in which clipping is skipped in high dimensional modulation.

Referring to FIG. 4, in 401, a communication device recognizes a neighboring modulation method. For example, the communication device may be a terminal. Accordingly, the terminal may recognize the neighboring modulation method by receiving, from a base station, information on modulation methods used by neighboring terminal devices.

In 402 to 404, the communication device recognizes a self modulation method. In addition, the communication device may determine whether to perform clipping or skip clipping with respect to an input signal based on the self modulation method and the neighboring modulation method.

In 405 and 406, when the communication device determines to clip the input signal, the communication device determines a CR corresponding to the self modulation method.

If the self modulation method is 64 QAM, in 407 the communication device determines whether to clip the input signal based on a signal to interference plus noise ratio (SINR) of the input signal. For example, the communication device may compare the SINR of each symbol section of the input signal with a reference SINR, to determine whether to skip or perform clipping for each symbol section.

If the SINR of the input signal is higher than a preset reference SINR (407:YES), the communication device determines whether to skip clipping in 409 because a BER performance of the clipped signal may be lower than a BER performance of an original input signal. In 410, the communication device performs IFFT with respect to the original input signal that is not clipped. Thus, if the self modulation method is 64 QAM, the communication device may not clip an input signal having a high SINR. Accordingly, reduction in the BER performance which is caused by clipping the input signal having the high SINR may be reduced or prevented.

As another example, if the SINR of the input signal is lower than or equal to the preset reference SINR (407:NO), the communication device determines a CR corresponding to 64 QAM. In 411, the communication device performs IFFT with respect to the clipped input signal.

In 412, the communication device compares an amplitude of the IFFT input signal with a maximum allowable signal amplitude corresponding to the CR. For example, if the amplitude of the IFFT input signal is greater than the maximum allowable signal amplitude corresponding to the CR, the communication device may clip the amplitude of the IFFT input signal based on the maximum allowable signal amplitude in 413.

In 414, the communication device performs band pass filtering with respect to the clipped input signal so that only a signal included in a target band among the clipped input signal is passed and a signal present other than the target band is interrupted. In addition, the communication device may convert and output the filtered signal into an analog signal.

In the examples of FIGS. 2 to 4 the CR is adaptively determined based on the modulation method by recognizing a neighboring modulation method. However, the communication device may determine the CR without recognizing the neighboring modulation method, for example, when the neighboring modulation method and the self modulation method are the same or similar. For example, the neighboring modulation method and the self modulation method may be similar when the modulation methods are QPSK and 16 QAM, respectively, and thus, noise influences with respect to each other are relatively minor or are within a predetermined reference value.

In the examples of FIGS. 2 to 4, clipping is adaptively performed based on the modulation method of the communication device. As another example, the communication device may determine whether to perform clipping using both the modulation method and a location of a terminal device.

For example, the communication device may be a base station and the self modulation method may be 16 QAM or 64 QAM. In this example, if a terminal device is located within a predetermined reference distance from a center of a cell, the base station may determine whether to skip clipping with respect to the input signal. As another example, the communication device may be a terminal, and the self modulation method may be 16 QAM or 64 QAM. In this example, if the terminal is located within a predetermined reference distance from a center of a cell, the terminal may determine whether to skip clipping with respect to the input signal.

As another example, communication device may be a base station and the self modulation method may be QPSK. In this example, if a terminal device is located at an edge of a cell which is relatively far from a center of the cell, the base station may determine to perform clipping with respect to the input signal. As another example, if the communication device is a terminal and the self modulation method is QPSK, and the terminal is located at an edge of a cell, the terminal may determine to perform clipping with respect to the input signal.

Figure 5:
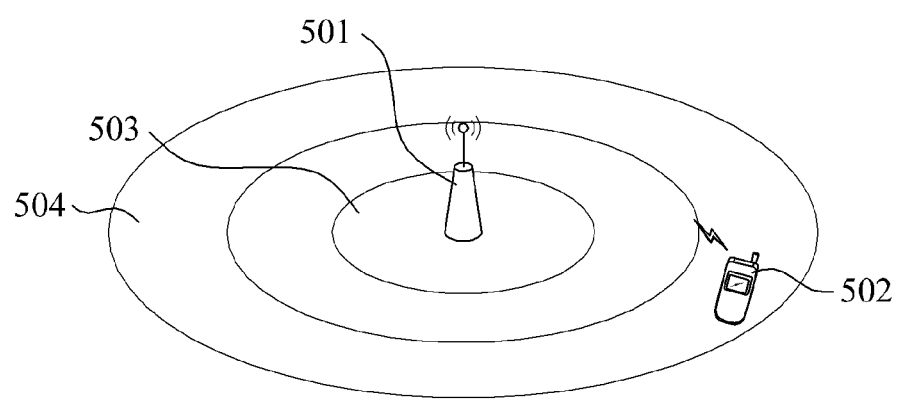
FIG. 5 is a diagram illustrating an example of an operation for adaptively determining a CR based on a location of a terminal device.

FIG. 5 illustrates an example of an operation for adaptively determining a CR based on a location of a terminal device 502. Referring to FIG. 5, a base station 501 may be used as a communication device. In this example, the base station 501 may determine the CR to be higher the farther away the terminal device 502 is located from a center of a cell and determine the CR to be lower the closer the terminal device 502 is located to the center of the cell. For example, if the terminal device 502 is located in a center area 503 of the cell, the base station 501 may determine the CR to be higher than when the terminal device 502 is located at an edge 504 of the cell. If the terminal device 502 is located at the edge 504 of the cell, the base station 501 may determine the CR to be lower than when the terminal device 502 is located at the center area 503 of the cell. In this example, the base station 501 may clip an input signal received from the terminal device 502 based on the determined CR.

As another example, if the terminal device 502 is used as the communication device, the terminal device 502 may determine the CR to be higher the farther away the terminal device 502 is located from the base station 501 which is located at the center of the cell. Also, the terminal device 502 may determine the CR to be lower the closer the terminal device 502 is located to the base station 501. For example, if the terminal device 502 is located at the center area 503 of the cell, the terminal device 502 may determine the CR to be 'a' dB. If the terminal device 502 is located at the edge 504 of the cell, the terminal device 502 may determine the CR to be 'c' dB. If the terminal device 502 is located between the center area 503 and the edge 504 of the cell, the terminal device 502 may determine the CR to be 'b' dB. Here, the relationships among a, b, and c may be a<b<c.

In addition, the communication device may perform IFFT with respect to the input signal and clip amplitude of the IFFT signal based on the CR.

In this example, the CR is adaptively determined according to location of the communication device, however, the communication device may adaptively determine the CR based on an SINR of an input signal. Furthermore, the communication device may perform IFFT with respect to the input signal and perform clipping with respect to the IFFT signal based on the CR that is adaptively determined based on the SINR. For example, the communication device may determine the CR to be lower as the SINR of the input signal is lower and determine the CR to be higher as the SINR is higher.

For example, a table mapping the CR based on a range of the SINR may be produced in advance. In this example, the communication device may perform clipping using the table. For example, if the SINR is between 0 dB and 2 dB, the communication device may determine the CR to be 1 dB (0<SINR<2→CR=1 dB). As another example, if the SINR is between 2 dB and 5 dB, the communication device may determine the CR to be 2 dB (2<SINR<5→CR=2 dB). If the SINR is between 5 dB and 7 dB, the communication device may determine the CR to be 2.5 dB (5<SINR<7→CR=2.5 dB). Similarly, if the SINR is between 25 dB and 30 dB, the communication device may determine the CR to be 7.5 dB (25<SINR<30→CR=7.5 dB). Further, if the SINR is 30 dB or greater, the communication device may not perform clipping (SINR>30 dB→skip clipping).

According to various aspects, the communication device may clip an input signal using the mapping table produced in advance. The mapping table may include optimum values preset through experiments. As the range of the SINR is more detailed, more various CRs may be applied. As a result, PAPR efficiency may be increased.

Figure 6:
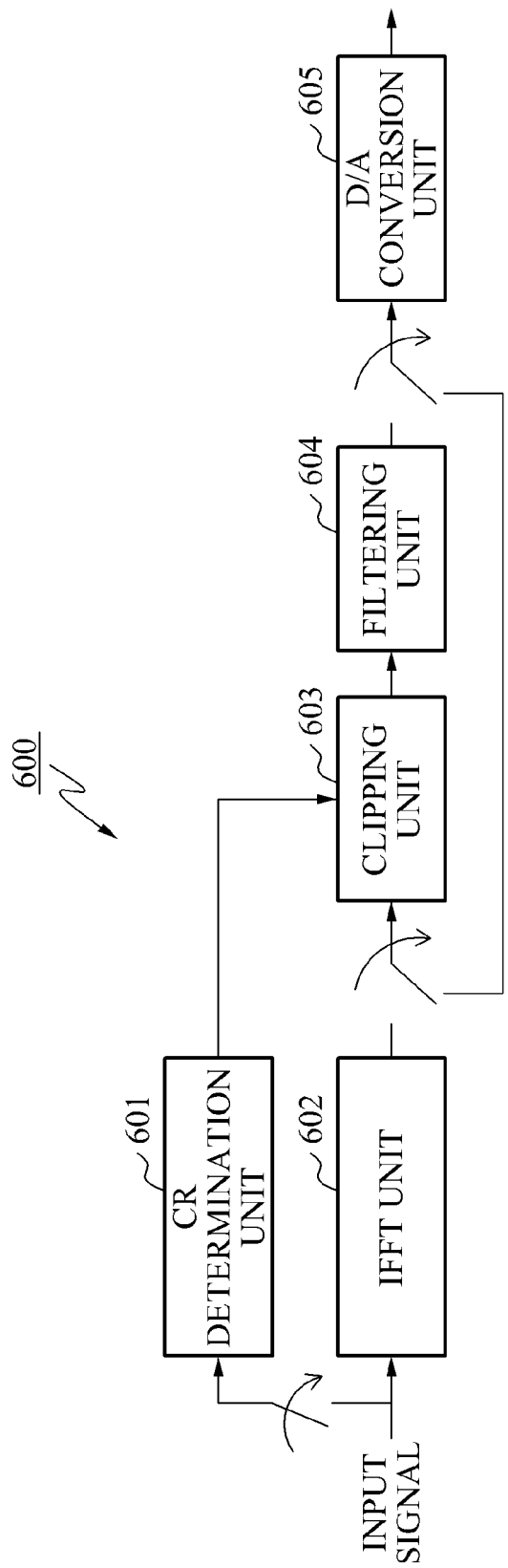
FIG. 6 is a diagram illustrating an example of a communication device for increasing energy efficiency.

FIG. 6 illustrates an example of a communication device 600 for increasing energy efficiency. Referring to FIG. 6, the communication device 600 includes a CR determination unit 601, an IFFT unit 602, a clipping unit 603, a filtering unit 604, and a digital/analog (D/A) conversion unit 605. For example, the communication device 600 may be a fixed base station, a mobile base station, a micro base station such as a femto base station, a data transmitter such as a relay, a fixed terminal device, a mobile terminal device, a data receiver such as a relay, and the like.

The CR determination unit 601 may determine a CR based on a modulation method of the communication device 600. Here, the modulation method of the communication device 600 may be referred to as a self modulation method. For example, the CR determination unit 601 may set the CR to be higher when the modulation method is higher dimensional than when the modulation method is lower dimensional. For example, QPSK, 16 QAM, and 64 QAM may be arranged in order from low dimensional to high dimensional.

For example, the CR determination unit 601 may adaptively determine the CR based on the modulation method which may be based on a maximum allowable signal amplitude ($A_{max}$) preset corresponding to respective modulation methods and power ($P_{in}$) of an input signal.

In addition, the CR determination unit 601 may determine whether to perform at least one of clipping and SC-FDMA with respect to the input signal, by recognizing a neighboring modulation method. Here, the neighboring modulation method refers to a modulation method used in neighboring communication devices corresponding to bands that neighbor a band allocated to the communication device 600.

For example, if the self modulation method is a low dimensional modulation method such as QPSK and the neighboring modulation method is a high dimensional modulation method such as 64 QAM, the CR determination unit 601 may determine whether to skip clipping and perform only SC-FDMA.

As another example, if the self modulation method and the neighboring modulation method are the same or similar, the CR determination unit 601 may determine to perform both clipping and SC-FDMA. For example, the neighboring modulation method and the self modulation method may be similar when the modulation methods are QPSK and 16 QAM, respectively. Accordingly, noise influences with respect to each may be within a range in which communication quality is not reduced to a lower quality than a reference quality.

As another example, if the self modulation method and the neighboring modulation method are the same or similar, the CR determination unit 601 may determine to perform only clipping. In addition, the CR determination unit 601 may determine whether to skip clipping if the self modulation method is recognized as a high dimensional modulation method.

For example, if the self modulation method is recognized as 64 QAM, the CR determination unit 601 may compare an SINR of each symbol section of the input signal with a reference SINR. Additionally, the CR determination unit 601 may determine whether to skip or perform clipping based on the comparison result. For example, if the SINR of the input signal is higher than the reference SINR, the CR determination unit 601 may determine whether to skip clipping because BER performance may be reduced by clipping. As another example, if the SINR of the input signal is lower than or equal to the reference SINR, the CR determination unit 601 may determine to perform clipping with respect to the input signal. In this case, the CR determination unit 601 may determine the CR corresponding to the modulation method.

Thus, as the CR determination unit 601 determines whether to skip or perform clipping by recognizing the SINR of each symbol section in 64 QAM, reduction in the BER performance caused by clipping in high dimensional modulation may be reduced. Accordingly, PAPR efficiency may be increased.

The IFFT unit 602 may perform IFFT with respect to the input signal. The clipping unit 603 may clip an amplitude of the input signal based on the CR corresponding to the modulation method and based on whether clipping is performed. If the CR determination unit 601 determines not to clip the input signal, the clipping unit 603 may skip the clipping.

The filtering unit 604 may perform band pass filtering with respect to the clipped input signal. For example, the filtering unit 604 may pass only a signal included in a target band allocated to the communication device while interrupting a signal that is not included in the target band. As the filtering unit 604 filters the clipped signal, the clipped signal may not affect the neighboring band in a frequency domain as a noise. The D/A conversion unit 605 may convert the filtered signal in a digital form into an analog signal.

As described with reference to FIG. 6, whether clipping is to be performed or skipped is determined based on the modulation method. Further, the CR is adaptively determined according to the modulation method. As another example, the communication device may adaptively determine whether to perform clipping and the CR, based on the SINR of the input signal or location of a terminal device.

In an example in which the SINR is used, the communication device may set the CR to be higher when the SINR of the input signal is higher and set the CR to be lower when the SINR is lower. As another example, if the location of the input signal is used, the communication device may set the CR to be lower the farther away the terminal device is located from a center of a cell and set the CR to be higher the closer the terminal device is located to the center of the cell. As another example, if the terminal device is used as the communication device and the terminal device adaptively performs clipping, an NI may be generated among terminal devices.

As an example, a total number of subcarriers may be 1024, and five terminal devices may be used. In this example, each of the terminal devices may use approximately 200 subcarriers on average. If a first terminal device performs clipping with respect to a signal that uses 200 subcarriers, spectral leakage beyond a frequency band allocated to the first terminal device may be removed or reduced through filtering. However, an in-band NI may be hard to remove due to a high complexity. That is, as an input signal of the first terminal device is clipped, the NI may affect the remaining second through fifth terminal devices.

In this example, if the self modulation method and the neighboring modulation method are QPSK or 16 QAM, that is, similar or the same, influence of the NI may be negligible. However, if the self modulation method is 64 QAM, performance may be reduced due to the NI according to the SINR. Accordingly, if the self modulation method is 64 QAM, the communication device may recognize the SINR of each symbol section and skip clipping when the recognized SINR is greater than a reference SINR, to thereby prevent reduction in performance.

According to various aspects, it is possible to increase efficiency of a peak to average power ratio (PAPR) while reducing complexity in comparison to single carrier-frequency to division multiplexing access (SC-FDMA), by clipping an amplitude of an input signal based on a clipping ratio (CR) that is adaptively determined according to a modulation method.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for increasing energy efficiency of a communication device, the method comprising:
adaptively determining a clipping ratio (CR) of a signal input to the communication device based on a modulation scheme of the communication device;
the adaptively determining comprising:
determining to perform clipping with respect to the input signal in response to a neighboring modulation scheme and a self modulation scheme are low dimensional modulation schemes; and
determining to perform clipping with respect to the input signal in response to the neighboring modulation scheme is a high dimensional modulation scheme and the self modulation scheme is a low dimensional modulation scheme;
performing an inverse fast Fourier transform (IFFT) on the input signal; and
in response to determining to perform clipping with respect to the input signal, clipping the IFFT signal based on the adaptively determined CR,
wherein the CR is determined to be higher as a maximum allowable single amplitude increases, and the CR is determined to be lower as a power of the input signal increases.

2. The method of claim 1, wherein the adaptively determining comprises:
setting the CR to be higher if the modulation scheme corresponds to a higher dimensional modulation scheme.

3. The method of claim 2, wherein a maximum allowable signal amplitude for the higher dimensional modulation scheme is preset to be higher than a maximum allowable signal amplitude for a lower dimensional modulation scheme.

4. The method of claim 1, wherein the adaptively determining comprises:
determining whether to perform single carrier-frequency division multiple access (SC-FDMA) with respect to the input signal based on a neighboring modulation scheme.

5. The method of claim 4, wherein the adaptively determining comprises:
determining to perform SC-FDMA with respect to the input signal if the neighboring modulation scheme is a high dimensional modulation scheme and the self modulation scheme is a low dimensional modulation scheme.

6. The method of claim 1, wherein the adaptively determining comprises:
determining whether to perform clipping with respect to the input signal based on a signal to interference plus noise ratio (SINR) of the input signal when the modulation scheme is a high dimensional modulation scheme.

7. The method of claim 1, wherein the adaptively determining comprises:
determining whether to perform clipping with respect to the input signal based on the modulation scheme and location of a terminal.

8. The method of claim 7, wherein the adaptively determining comprises:
determining to skip clipping with respect to the input signal when the modulation scheme is a 16 quadrature amplitude modulation (QAM) or higher dimensional modulation scheme; and
determining to perform clipping with respect to the input signal when the modulation scheme is a quadrature phase shift keying (QPSK) scheme and the terminal device is located at an edge of a cell.

9. The method of claim 1, further comprising:
performing band pass filtering with respect to the clipped signal.

10. The method of claim 1, wherein the modulation scheme is based on a preset maximum allowable signal amplitude.

11. The method of claim 10, further comprising:
presetting the maximum allowable signal amplitude corresponding to respective modulation schemes using a error vector magnitude (EVM), wherein the EVM is calculated based on an original input signal and the clipped IFFT signal.

12. The method of claim 1, further comprising:
performing band pass filtering to the clipped IFFT signal such that the clipped IFFT signal does not influence signals of neighboring bands that include the clipped IFFT signal.

13. A method of a communication device for increasing energy efficiency, the method comprising:
adaptively determining a clipping ratio (CR) for a signal input to the communication device based on a location of a terminal device in a cell and a center of the cell; the adaptively determining comprising:
determining to perform clipping with respect to the input signal in response to a neighboring modulation scheme and a self modulation scheme are low dimensional modulation schemes; and
determining to perform clipping with respect to the input signal in response to the neighboring modulation scheme is a high dimensional modulation scheme and the self modulation scheme is a low dimensional modulation scheme;
performing inverse fast Fourier transform (IFFT) on the input signal;
andclipping the IFFT signal based on the adaptively determined CR.

14. The method of claim 13, wherein the adaptively determining comprises:
determining the CR to be higher the farther away the terminal device is located from a center of the cell in which the terminal device is located and to be lower the closer the terminal device is located to the center of the cell.

15. A method of a communication device for increasing energy efficiency, the method comprising:
adaptively determining a clipping ratio (CR) for a signal input to the communication device based on a signal to interference plus noise ratio (SINR) of the input signal; the adaptively determining comprising:
determining to perform clipping with respect to the input signal in response to a neighboring modulation scheme and a self modulation scheme are low dimensional modulation schemes; and
determining to perform clipping with respect to the input signal in response to the neighboring modulation scheme is a high dimensional modulation scheme and the self modulation scheme is a low dimensional modulation scheme;
performing inverse fast Fourier transform (IFFT) on the input signal; and
clipping the IFFT signal based on the adaptively determined CR,
wherein the CR is determined to be higher as a maximum allowable single amplitude increases, the CR is determined to be lower as a power of the input signal increases.

16. The method of claim 15, wherein the adaptively determining comprises:
determining the CR to be lower in response to the SINR being lower and determining the CR to be higher in response to the SINR being higher.

17. A communication device for increasing energy efficiency, the communication device comprising:
a clipping ratio (CR) determination unit configured to adaptively determine a CR for a signal input to the communication device based on a modulation scheme of the communication device; the adaptively determining comprising:
determining to perform clipping with respect to the input signal if the neighboring modulation scheme and a self modulation scheme are low dimensional modulation schemes; and
determining to perform clipping with respect to the input signal if the neighboring modulation scheme is a high dimensional modulation scheme and the self modulation scheme is a low dimensional modulation scheme;
an inverse fast Fourier transform (IFFT) unit configured to perform IFFT on the input signal;
a clipping unit configured to clip the IFFT signal based on the adaptively determined CR, in response to determining that clipping is to be performed,
wherein the CR is determined to be higher as a maximum allowable single amplitude increases, and the CR is determined to be lower as a power of the input signal increases.

18. The communication device of claim 17, wherein the CR determination unit sets the CR higher if the modulation scheme corresponds to a higher dimensional modulation scheme.

19. The communication device of claim 17, wherein the CR determination unit determines whether to perform single carrier-frequency division multiple access (SC-FDMA) with respect to the input signal based on a neighboring modulation scheme.

20. The communication device of claim 17, wherein the CR determination unit determines whether to perform clipping with respect to the input signal based on a signal to interference plus noise ratio (SINR) of the input signal when the modulation scheme is a high dimensional modulation scheme.

21. The communication device of claim 17, wherein the CR determination unit determines whether to perform clipping with respect to the input signal based on the modulation scheme and a location of a terminal device.

22. The communication device of claim 17, further comprising a filtering unit configured to perform band pass filtering with respect to the clipped signal.

* * * * *